United States Patent [19]
Sullivan

[11] 3,756,099
[45] Sept. 4, 1973

[54] APPARATUS FOR MACHINING A SPLIT ENGINE RING AND SIMILAR WORKPIECES

[76] Inventor: Edward F. Sullivan, 4465 Bradshaw St., Saginaw

[22] Filed: Jan. 3, 1972

[21] Appl. No.: 214,738

[52] U.S. Cl............... 82/2.7, 82/1.2, 82/2.5, 29/27
[51] Int. Cl..... B23b 5/26, B23b 13/00, B23b 15/00
[58] Field of Search .............. 29/27; 82/1.2, 2.5, 82/2.7

[56] References Cited
UNITED STATES PATENTS
3,165,011  1/1965  Kelly................... 82/2.5 X
2,377,960  6/1945  Phillips.................. 29/27

FOREIGN PATENTS OR APPLICATIONS
393,047  10/1965  Switzerland............. 29/27

*Primary Examiner*—Francis S. Husar
*Attorney*—John F. Learman et al.

[57] ABSTRACT

Apparatus for machining ring-shaped workpieces, such as a split engine ring which is positioned at a work station, including: a machining tool movable in a cutting path of travel between a radially inner position and a radially outer position at the work station in a manner to progressively machine the radially inner surface of the workpiece.

17 Claims, 13 Drawing Figures

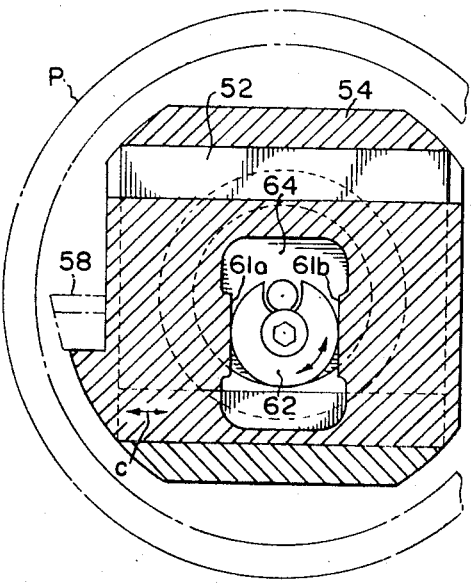
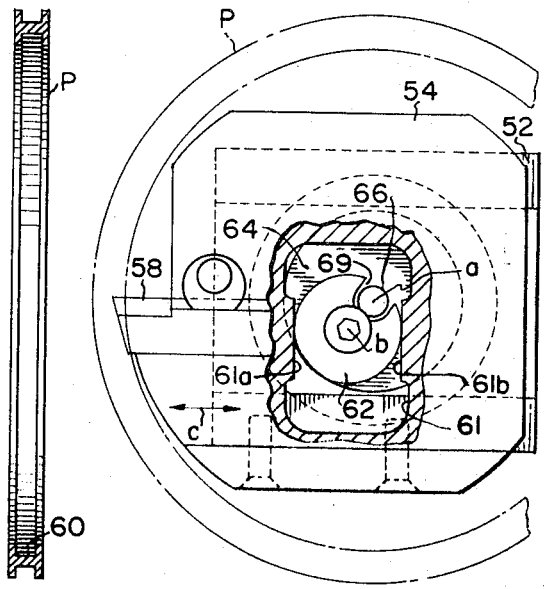
FIG.4　　FIG.8　　FIG.5
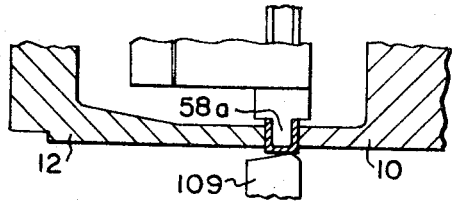
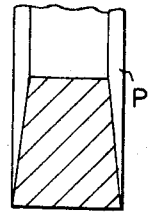
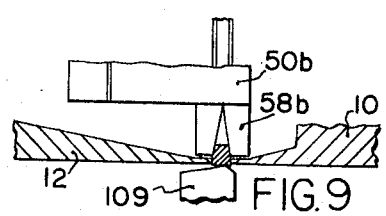
FIG.7　　FIG.10　　FIG.9
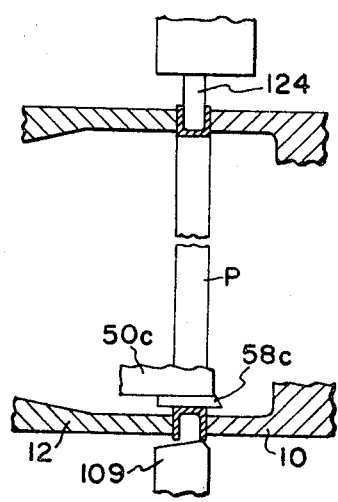
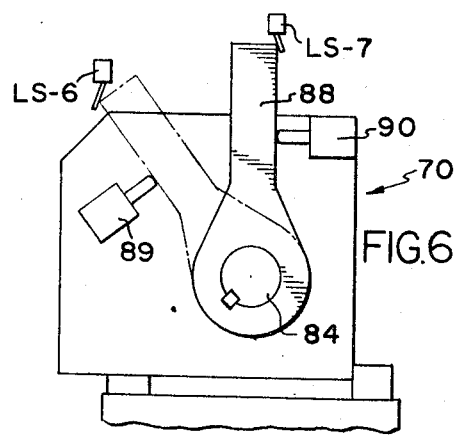
FIG.11　　FIG.6

3,756,099

APPARATUS FOR MACHINING A SPLIT ENGINE RING AND SIMILAR WORKPIECES

FIELD OF THE INVENTION

This invention relates to machining apparatus, and more particularly to apparatus for machining the radially inner surface of a ring-shaped article.

BACKGROUND OF THE INVENTION

Gasoline engine rings, such as those utilized in Wankel type engines and the like, must be machined to precision tolerances. It is important, therefore, that any play in an engine ring machining system be eliminated to minimize the tool chatter and vibration which causes the machining tool to unevenly and inaccurately machine engine rings. Accordingly, it is an object of the present invention to provide machining apparatus which will accurately machine engine rings and like workpieces.

It is another object of the present invention to provide apparatus for machining the radially inner surfaces of ring-shaped articles, such as engine rings, and which positively controls the cutting movement of the machining tool.

To reduce plant inventory, it is desirable that machines of the type mentioned have the capability of performing several different machining operations. It is imperative that the machine be of such construction that the changeover can be quickly accomplished to maximize production. Accordingly, it is another object of the present invention to provide a machine which has the capability of performing several different machining operations on the interior surface of a ring-shaped workpiece, such as an engine ring, with a minimum of change-over time between the different machining operations.

It is yet another object of the present invention to provide apparatus for machining the radially inner surface of a ring-shaped workpiece, including an axially removable tool mounting cutter-head which can be quickly replaced.

If the radially outer and inner surfaces of such ring-shaped workpieces are sequentially machined, the outer and inner machined surfaces will generally not be concentric. It is still a further object of the present invention to provide apparatus which will simultaneously, concentrically machine the radially outer and inner surfaces of a ring-shaped workpiece.

Other objects and advantages of the present invention will become apparent to those of ordinary skill in the art as the description thereof proceeds.

SUMMARY OF THE INVENTION

Apparatus for machining ring-shaped workpieces, such as engine rings, including means for sequentially delivering workpieces to a machining station comprising means for axially moving the workpieces to a machining station and for clamping axially opposite sides of a workpiece at the machining station, workpiece machining means mounted for movement in an axial and radial path of travel between a radially inner position, axially removed from a work station, and a radially outer position at the machining station, means for relatively rotating the machining means and the clamping means, and means for moving the machining means axially and radially into cutting engagement with the radially inner surface of the ring-shaped workpiece clamped at the machining station to machine the radially inner surface of a clamped workpiece.

The present invention may more readily be described by reference to the accompanying drawings, in which:

FIG. 1A is an end elevational view, taken along the line 1A—1A of FIG. 1, illustrating a typical split engine ring which can be machined by apparatus constructed according to the invention;

FIG. 4 is an enlarged, sectional fragmentary end elevational view, taken along the line 4—4 of FIG. 2, illustrating a tool mounting slide, in a radially inner position, and a rotary cam for feeding the slide in a to-and-fro path of travel;

FIG. 5 is a fragmentary end elevational view, taken along the line 5—5 of FIG. 2, illustrating the slide moving cam rotatably displaced from the position illustrated in FIG. 4, and the tool mounting slide in a radial outer machining position, part of the tool mounting slide being broken away to more clearly illustrate the slide moving cam;

FIG. 6 is an enlarged, fragmentary end elevational view taken along the line 6—6 of FIG. 1, illustrating a rotary fluid drive unit, for rotating the slide moving cam, the chain lines illustrating a different position of rotation;

FIG. 7 is an enlarged, fragmentary top plan view of mechanism constructed according to the present invention and illustrating a pair of opposed, inner and outer machining tools simultaneously machining inner and outer surfaces of a ring-shaped workpiece clamped at the work station;

FIG. 8 is an enlarged, sectional top plan view of a machined workpiece which has internal and external grooves cut in its radially inner and outer surfaces by the plunge cutting apparatus illustrated in FIG. 3;

FIG. 9 is an enlarged, fragmentary top plan view of a machine constructed according to the present invention and illustrating an outer tool for machining the exterior surface of a workpiece and an inner tool for simultaneously keystoning the inner surface of a ring-shaped workpiece clamped at the work station;

FIG. 10 is a still further enlarged cross-sectional view of an engine ring machined with the machining apparatus illustrated in FIG. 9;

Figure 12:
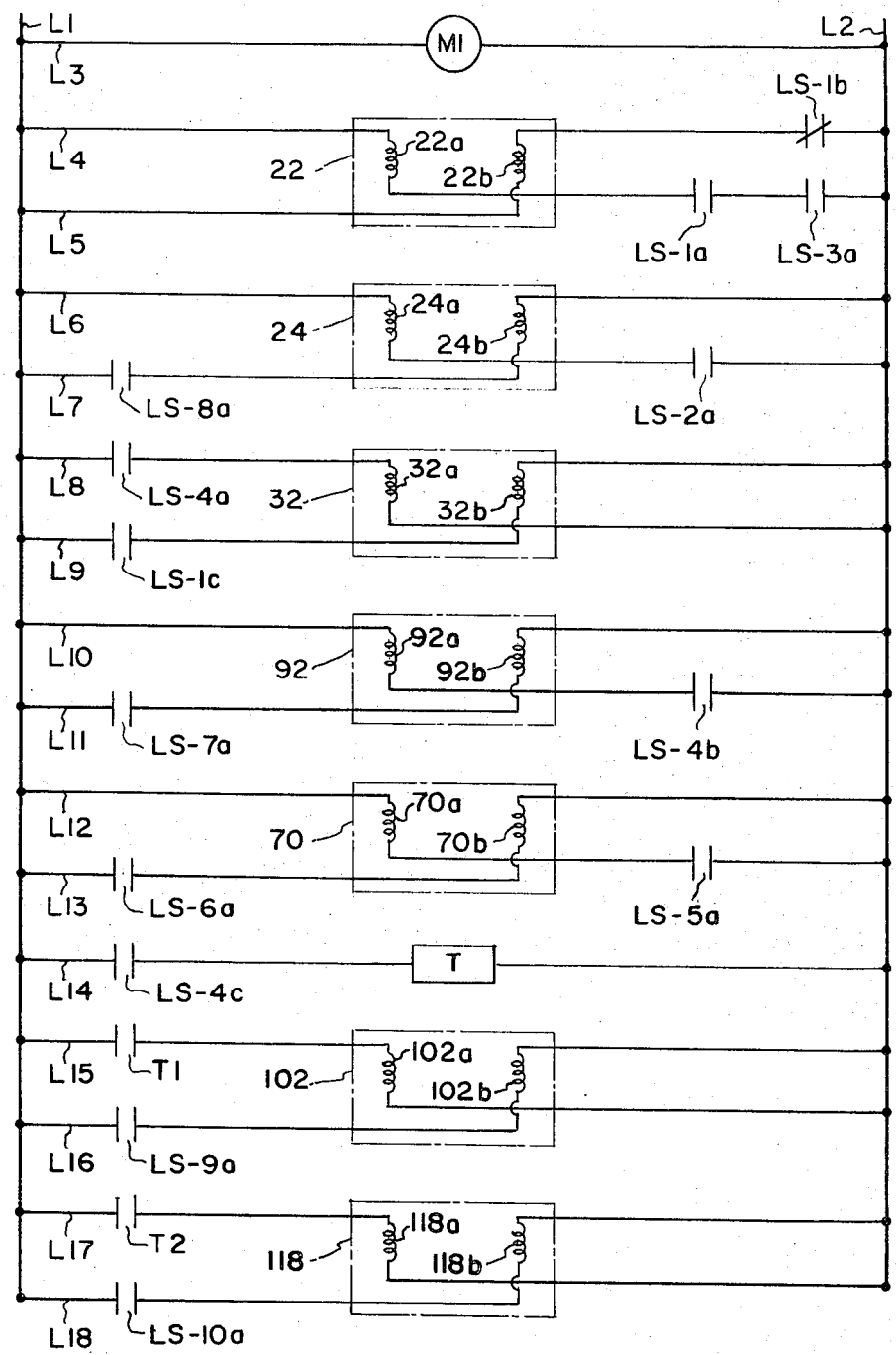

FIG. 11 is an enlarged, fragmentary top plan view of a machine constructed according to the present invention and particularly illustrating an inner boring tool for boring the interior surface of a ring-shaped workpiece clamped at the work station; and radially diametrically opposed, exterior surface plunge cutting and finishing tools; and FIG. 12 is a schematic diagram of a typical control circuit for operating the apparatus illustrated in FIGS. 1–11.

THE GENERAL DESCRIPTION

Machining apparatus constructed according to the invention is mounted on a frame, generally designated F, which is similar to the frame F in U.S. Pat. application Ser. No. 026,027, filed by Mr. Edward F. Sullivan in the U.S. Pat. Office on Apr. 6, 1970, entitled "Method and Apparatus for Machining rings" and now U.S. Pat. No. 3,660,945, and incorporated herein by reference. Apparatus, not shown, but fully disclosed in the referenced patent application, is provided for urging a stack S of split engine rings P into engagement with the vertical end wall 24a of a frame supported housing 20a, constructed identically to the housing H disclosed in the above referenced patent application. A guillotine feeder mechanism, generally designated G, is provided for successively individually stripping an endmost ring P from a stack S of such rings and transferring it individually to a ring closing sleeve, generally designated C. The guillotine mechanism G is constructed identically to the guillotine mechanism G disclosed in the above referenced patent application and includes a double acting, fluid operated, solenoid controlled cylinder 22 for reciprocally moving the guillotine G in a vertical path of travel, as will be described more particularly hereinafter, to successively strip the endmost rings from the stack S and move them into the frame supported closing sleeve C which is constructed identically to the closing sleeve C in the referenced patent application.

Transfer apparatus, generally designated T, is provided and includes a rotatable clamping ring 10 for engaging one side of a ring P, positioned in the closing sleeve C, and moving it through the sleeve C into engagement with an axially opposed clamping ring 12, rotatably mounted on the machine frame F, to a machining station W. A cutterhead assembly, generally designated 14, is movable to a position interiorly of the ring 12 for machining the radially interior surface 15 of the ring P clamped at the machining station W. Additional exterior surface ring machining tool assemblies, generally designated 16 and 18, (FIG. 3) are mounted on the machine frame F for simultaneously machining the exterior surface of a ring P clamped at the work station W in a manner to be described more particularly hereinafter.

Each of the split rings P (FIG. 1A), in uncompressed position, has a gap g between its ends. When a stack S of rings is positioned on the frame F, the gaps g in the rings in stack S are longitudinally aligned, and the rings are supported by the structure disclosed in the above referenced patent application.

THE TRANSFER AND CLAMPING APPARATUS

The transfer apparatus T for moving the rings P axially through the closing sleeve C includes a frame supporting housing member H mounting a double-acting, fluid operated, solenoid actuated cylinder 24. The cylinder 24 includes a piston rod 26 connected to a rotatable ring clamp mounting shaft 29 by a coupling 27 which permits the shaft 29 to rotate relative to the piston rod 26. The ring clamp mounting shaft 29 is journaled in housing supported bearings 29a and has a annular, ring clamp 10 fixed thereto. The closing sleeve C is mounted for movement, from the axially removed position, illustrated in chain lines in FIG. 1, to the workpiece receiving position at the work station W, illustrated in solid lines in FIG. 1, on a longitudinal mounting bar 28 slidably movable in the housing H and connected to the piston rod 30 of a fluid operated, double-acting, solenoid actuated cylinder 32 fixed to the housing H. After a ring P is clamped between the ring clamps 10 and 12 at the work station W, the closing sleeve moving cylinder 32 is operated to move the closing sleeve C to the axially remote position illustrated in chain lines in FIG. 1, removed from the work station W, before machining commences, to permit the exterior surface machining tools 16 and 18 to machine the radially outer peripheral surface of a ring clamped at the work station W. The ring clamp moving cylinder 24 exerts sufficient force that the ring P is held in the radially constricted position by the spindle clamp 12 and the ring clamp 10 after the closing sleeve is moved to its removed position.

The ring clamp member 12 is fixed to a tubular spindle 36 which is rotatably mounted in the frame supported housing 20 by bearings 38. The spindle 36 is externally splined and drivingly coupled to the internally and complementally splined hub of a drive pulley 40 which is driven by a motor driven timing belt 44 trained around the output shaft (not shown) of a drive motor M1, (line L3, FIG. 12).

THE INTERIOR SURFACE MACHINING ASSEMBLY

The cutter head assembly, generally designated 14, (FIGS. 1 and 2) is mounted on a tubular cutter head support sleeve 48 axially slidably received within the tubular spindle 36. The cutter head assembly 14 supports an annular, internally threaded end ring 50, mounted on the threaded end 48a of the tubular support member 48, which has a pair of vertically spaced, generally horizontal, parallel dovetail slides 52 (FIGS. 2 and 4) slidably receiving a tool mounting slide or head 54, which has complementally formed dovetail grooves 56.

The tool mounting slide 54 mounts a machining tool 58, such as a plunge cutting tool, for cutting an annular groove 60 (FIG. 8) in the interior surface of the ring P, clamped at the work station W, when the workpiece holding slide 54 is moved from the radially inner position, illustrated in FIG. 4, to the radially outer position, illustrated in FIG. 5. The workpiece holding slide 54 is vertically recessed at 61 for receiving a cam 62 fixed to the end of a rotatable shaft 64 which is rotatably received in the tubular support member 48. The cam mounting shaft 64 is rotatable about its axis $a$ whereas the axis $b$ of the cam 62 is eccentrically offset from axis $a$. As the shaft 64 is angularly displaced through part of a revolution in alternate directions about axis $a$, the cam 62 alternately engages surfaces 61a and 61b, on opposite sides of the vertical recess 60, to alternately feed the tool mounting slide 54 in opposite directions as represented by the arrows $c$.

An axial bore 66 is provided in the shaft 64 and communicates with a passage 68 communicating with a source of air such as a pressure tank and compressor, to blow chips, cut by the cutting tool 58, away from the tool 58. An aperture 69 is provided in the cam 62 in axial alignment with the bore 66 to permit the free and continuous flow of air to the machining station W.

Figure 1:
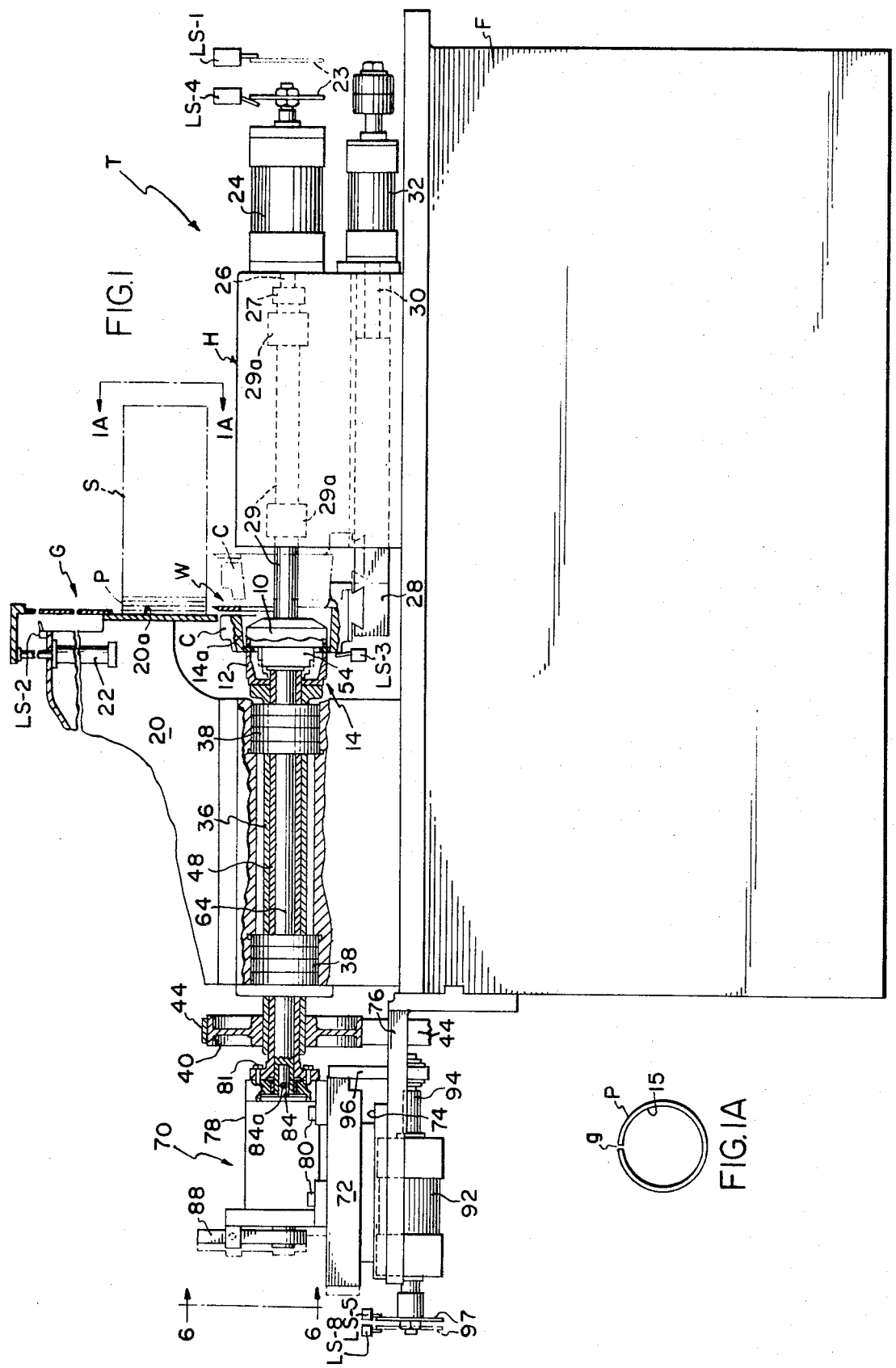
FIG. 1 is a partly sectional, side elevational view of machining apparatus constructed according to the present invention.

For rotating the cam positioning shaft 64 about its axis $a$, a rotary, fluid drive motor unit, generally designated 70, is mounted on a carriage 72 (FIG. 1) which tacts LS-8a of a limit switch LS-8 mounted on the frame in the path of the ROTAC supported actuator 88. The positioning sleeve retract solenoid 32a (line L8) for directing fluid to the closing sleeve positioning cylinder 32 so as to retract the closing sleeve 32 to the inoperative position, illustrated in chain lines in FIG. 1, is connected in series with the normally open contacts LS-4a which close when the clamp ring mounting piston reaches its forwardmost position, illustrated in solid lines in FIG. 1, to actuate the limit switch LS-4. The closing sleeve advance solenoid 32b (line L9) for directing fluid to the cylinder 32 so that it will advance the closing sleeve C to the ring receiving position at the work station W, is connected in series with a set of normally open contacts LS-1c which close when the clamp ring mounting ring 10 is fully retracted to actuate the limit switch LS-1.

The advance solenoid 92a (line L10) of the platform positioning cylinder 72 for advancing the interior surface machining tool 58 axially to the machining station, is connected in series with the normally open contacts LS-4b which close when the piston rod 26 of the clamp advance cylinder 24 reaches the forwardmost position, illustrated in solid lines in FIG. 1, to actuate the limit switch LS-4. The platform positioning retract solenoid 92b (line L11) is connected in series with the normally open contacts LS-7a which close when the ROTAC supported actuator 88 is returned to the solid line position illustrated in FIG. 9 to actuate the limit switch LS-7.

The advance solenoid 70a (line L12) for directing hydraulic fluid to the ROTAC unit 70 so as to rotate the ROTAC unit 70 and the accompanying actuator 88 from the start position, illustrated in solid lines, to the opposite position, illustrated in chain lines, is connected in series with the normally open contacts LS-5a which close when the limit switch LS-5, in the path of the actuator 97 on the platform positioning cylinder piston rod 94, is actuated as the actuator 97 reaches its axially inner position. The retract solenoid 70b (line L13) for directing fluid to the ROTAC unit such that the ROTAC unit will return to the start position, illustrated in solid lines in FIG. 9, is connected in series with the normally open contacts LS-6a which close when a limit switch LS-6 mounted on the frame is actuated by the ROTAC supported actuator 88.

The limit switch LS-4, positioned in the path of the ring clamp 10, also includes a set of contacts LS-4c (line L14) connected in series with a timer T which includes a set of contacts T1 and T2 (lines L15 and L17) which close a predetermined time after the timer T has been actuated. The timer contacts T1 (line L15) are connected in series with the advance solenoid 102a for moving the exterior machining tool 109 into machining position in timed relation with the movement of the interior machining tool 58. The retract solenoid 102b (line L16) for retracting the exterior machining tool 109 is connected in series with the normally open contacts LS-9a which are closed when the limit switch LS-9, mounted in the path of the tool mounting carriage 99, is actuated after the outer surface of the clamped ring is machined.

The timer contacts T2 (line L17) are connected in series circuit with the advance solenoid 118c for advancing the external grooving tool 124 inwardly toward the outer periphery of the ring. The retract solenoid 118b l.c L18) for retracting the machine tool 124 is connected in series with the normally open contacts LS-10a which close when the limit switch LS-10 is engaged by the tool mounting carriage 114.

THE OPERATION

Figure 2:
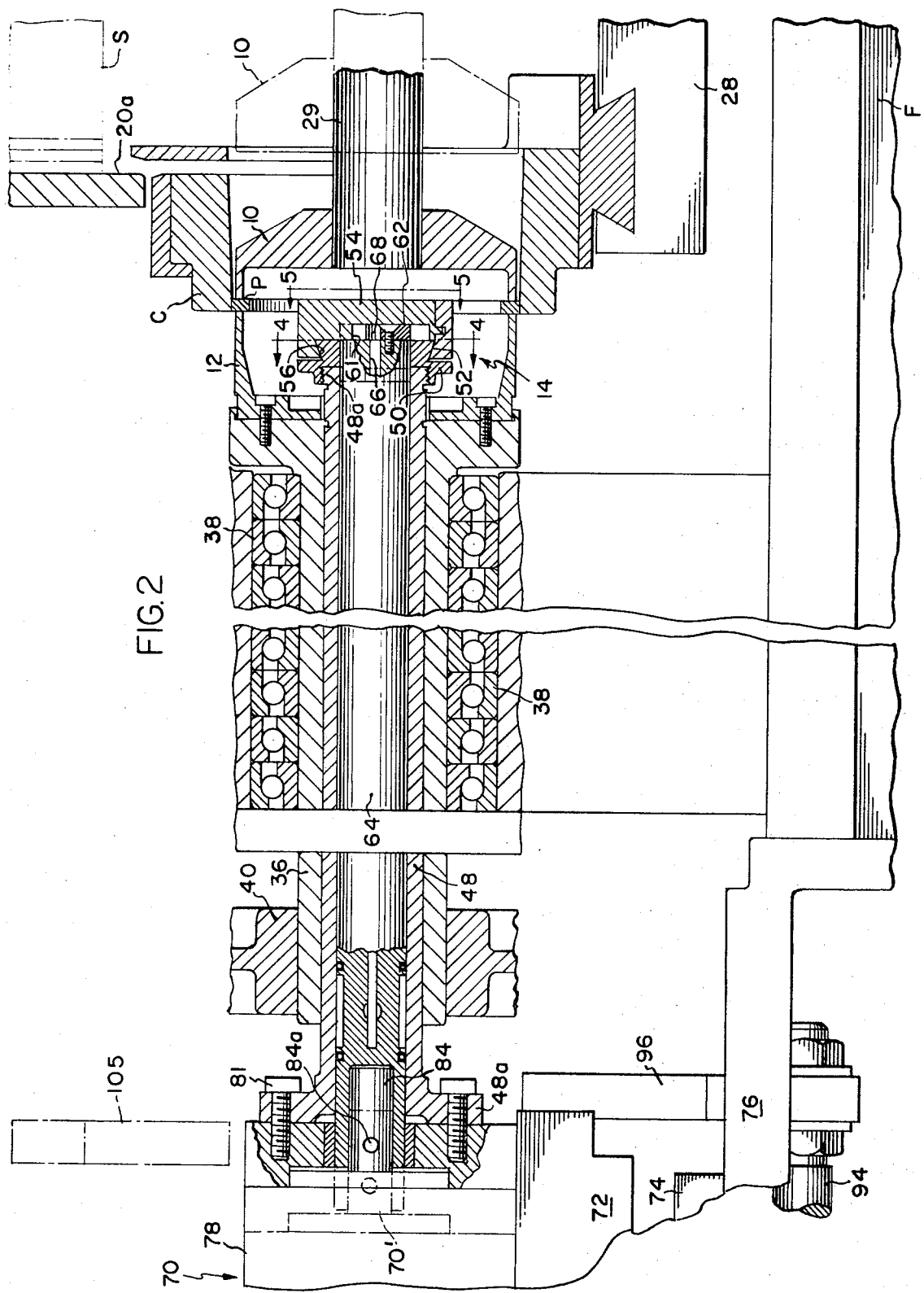
FIG. 2 is an enlarged, partly sectional, fragmentary side elevational view, more particularly illustrating the mechanism for machining the interior surface of a ring-shaped workpiece.

When power is applied to the circuit illustrated in FIG. 13, it will be assumed that the axially movable ring clamp 10 is initially in the rearward position, illustrated in chain lines in FIG. 2, that the actuator 23 connected to the piston rod of cylinder 24 is in engagement with the limit switch LS-1, and that the closing sleeve C is in the advanced, ring receiving position, illustrated in solid lines in FIG. 1. When power is applied to the circuit, the motor M1 (line L3) will be energized to rotatably drive the clamping spindle 48 supporting the opposite ring clamp 12. With the limit switch LS-1 being actuated by the actuator 23, the contacts LS-1a (line L4) will close to energize the guillotine lowering solenoid 22a which will be operative to direct fluid to the cylinder 22 so that the guillotine blade G will move downwardly to strip only the endmost piston ring from the stack S and move it downwardly to a position where it is guided by the closing sleeve C as described in the referenced patent application. As the guillotine reaches its lowermost position and the ring P is positioned in the closing sleeve C, it actuates the limit switch LS-2 and the limit switch contacts LS-2a (line L6) close to actuate the piston ring clamp advancing solenoid 24a (line L6) to move the ring clamp 10 forwardly from the axially removed position, illustrated in chain lines in FIG. 2, so that the ring P is moved axially in the tapered bore portion 14a of the closing sleeve to radially constrict the workpiece P and close the gap between its split ends. When the ring clamp 10 is moved forwardly, it will tightly clamp the ring P to the rotating spindle 12 and the clamped ring and clamp 10 will rotate therewith. When the clamp 10 is moved to its forwardmost clamping position, the limit switch LS-4 is actuated to close the contacts LS-4a (line L8), LS-4b (line L10) and LS-4c (line L14). When the contacts LS-4a close; the closing sleeve retract solenoid 32a (line L8) is energized to retract the closing sleeve to the retracted position, illustrated in chain lines in FIG. 1. Simultaneously, the closing of contacts LS-4b (line L5) energizes the platform advance solenoid 92a to forwardly advance the cutter head 14 and move the grooving tool 58 from the retracted position, illustrated in chain lines in FIG. 3 to a position inside the ring P clamped at the work station W. At the same time, the timer T in line L14 is actuated as the contacts LS-4c close.

When the interior grooving tool 58 has been moved to a position inside the ring to be grooved, the limit switch LS-5 is actuated to close the contacts LS-5a (line L12) to actuate the solenoid 70a for directing fluid to the ROTAC unit 70 in such a direction as to move the ROTAC armature 82 and the actuator 88 from the start position, illustrated in solid lines in FIG. 6, to the position, illustrated in chain lines in FIG. 6. The cutter head support shaft 64 is thereby rotated, causing the cam 62 fixed to the end of the shaft 64, to move clockwisely (FIGS. 4 and 5) and feed the tool mounting slide 54 and tool 58 in a cutting path of travel from the radially inner position, illustrated in FIG. 4, to the radially outer position, illustrated in FIG. 5, to progressively groove the interior surface of the clamped engine ring P. At the same time, the timer T (line L14) has timed out and the contacts T1 (line L13) close to is reciprocally movable on ways 74 provided on a frame-supported platform 76. The rotary drive unit 70 includes an outer casing 78 bolted, as at 80, to the platform 72 and, as at 81, to an annular flange 48b on the end of the tubular cutter head support member 48. The rotary drive unit 70 includes an output shaft 84 connected to the cam mounting shaft 64 by a pin 84a. A fluid operated, rotary, oscillating, torque actuator of the type manufactured by Excello Corporation, Detroit, Mich., and sold under the trademark ROTAC, has been found suitable for this purpose. A limit switch actuating and position control arm 88 is connected to opposite end of the shaft 84 and is movable therewith between angularly spaced, start and finish positions, illustrated in solid and chain lines, respectively, in FIG. 6 to actuate a pair of rotation reversing limit switches LS–6 and LS–7 supported on the motor casing 78. A pair of stops 89 and 90 are provided on the motor frame to positively interrupt the position control arm 88 and positively halt rotation of the motor shaft 84.

The system for directing fluid to the motor will be described more particularly hereinafter. For axially reciprocating the rotary drive motor support platform 72 and the cutterhead 14 between the axially removed and operative positions, illustrated in chain and solid lines respectively in FIG. 1, to move the interior surface machining tool 58 between an axially remote position and a position at the work station inside a workpiece P clamped at the work station, a double-acting, fluid operated cylinder 92 is supported on the platform 76 and includes a piston rod 94 fixed to a leg 96 depending from the platform 72. Mounted on the rear end of the piston rod 94 at the platform positioning cylinder 92 is an actuator 97 movable with the piston rod 94 for engaging a pair of limit switches LS–5 and LS–8 for a purpose to be described more particularly hereinafter.

THE MACHINING APPARATUS FOR MACHINING THE OUTER PERIPHERAL SURFACE

Figure 3:
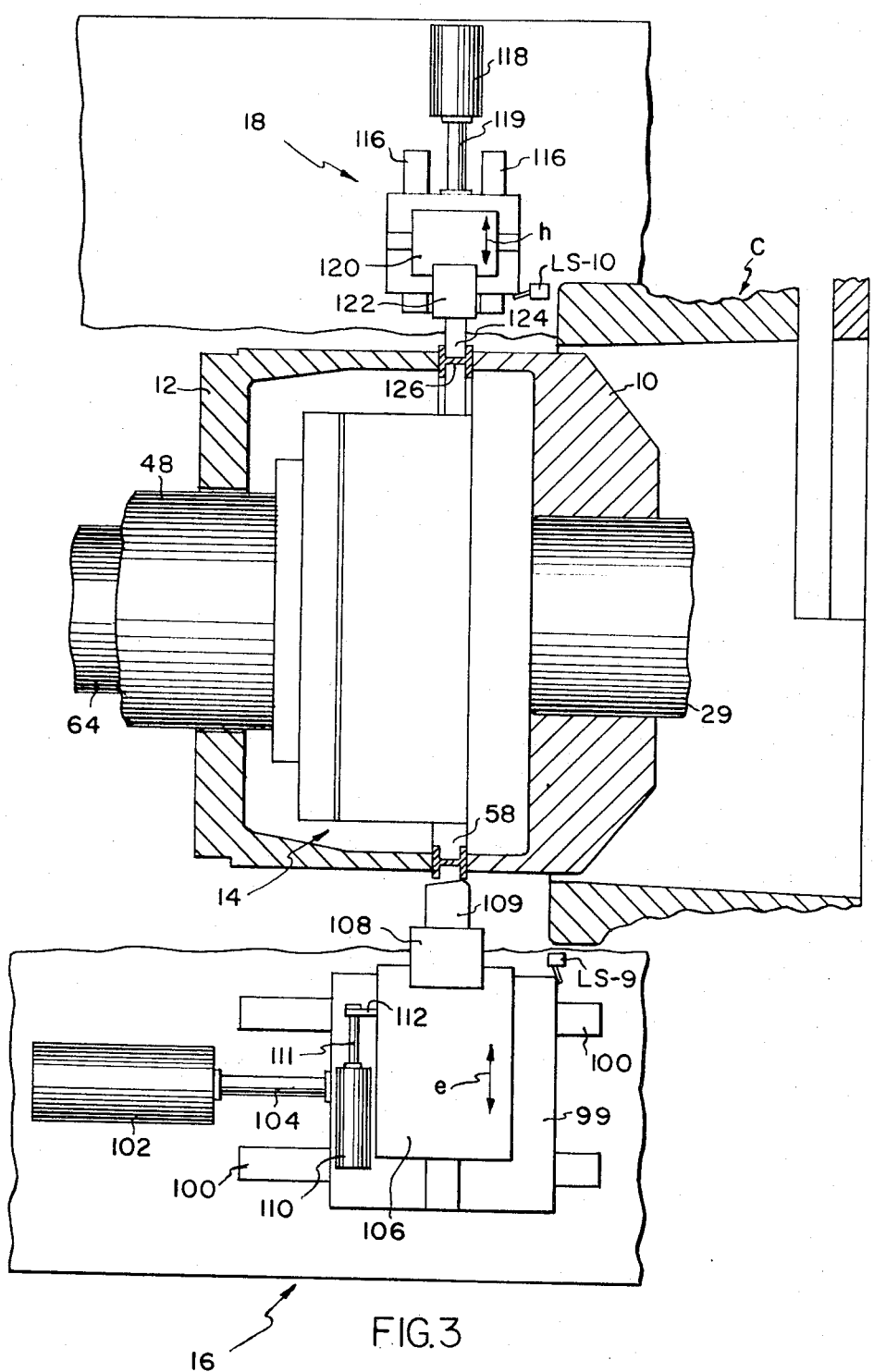
FIG. 3 is a still further enlarged, fragmentary top plan view of apparatus constructed according to the present invention, particularly illustrating inner and outer machining tools in position to simultaneously machine the radially inner and outer surfaces of a ring-shaped workpiece.

The exterior surface machining tool assembly, generally designated 16, is provided on the front side of the work station W in FIG. 3, and includes a longitudinally movable carriage 99 (FIG. 3) supported for longitudinal movement by a pair of longitudinal frame-supported rails 100. The carriage 99 may be longitudinally driven by a frame-supported, double-acting, fluid operated, solenoid actuated cylinder 102 having a piston rod 104 connected with the carriage 99 or alternatively could be driven by motor M1 via a ball screw and nut assembly. Supported on the carriage 99 for to-and-fro transverse movement thereon, in the path represented by the arrows e (FIG. 3) is a sub-carriage 106 mounting a tool holder 108 having a machining tool 109 removably fixed thereto. The tool 109, illustrated in FIG. 3, is a finishing tool for finishing the outer peripheral surface of ring P. For transversely moving the carriage 106, a double-acting fluid operated, solenoid actuated cylinder 110 is fixed to the platform 99 and includes a piston rod 111 connected at its forward end to a connector arm 112 fixed to the transversely movable carriage 106.

The exterior surface machining tool assembly 18 is mounted on the frame F at the rear side of the workpiece machining station W in FIG. 3, and includes a carriage 114 transversely movable, in the direction of the arrows f, on a pair of frame-supported tracks 116 by a double acting, solenoid actuated, fluid controlled, cylinder 118 having a piston rod 119 fixed to the carriage 114. Supported on the carriage 114 for longitudinal reciprocable movement thereon, in the path represented by the arrows g, is a sub-carriage 120 having a tool holder member 122 fixed thereto which mounts a tool member 124. The machining tool 124, illustrated in FIG. 3, is a plunge cutting tool for providing an annular groove 126 in the outer peripheral surface of a ring P clamped at the work station W. The interior surface machining tool 58 is provided for grooving and simultaneously finishing the interior groove surfaces of the ring. A ring machined with the exterior grooving and finishing tools 124, 109 and internal grooving and finishing tool 58 has the cross section as illustrated in FIG. 8.

Instead of grooving the outer peripheral surface with the grooving tool 124, the outer surface could alternatively be faced with turning tool 109. In this case a substitute internal diameter grooving tool 58a (FIG. 7), which provides a deeper cut than the tool 58, may be utilized.

Instead of grooving the inner peripheral surfaces of a ring, the inner peripheral surface may be keystoned by a keystoning tool 58b (FIG. 9), while the outer peripheral surface is simultaneously turned by tool 109, to provide a resulting ring P having the cross section illustrated in FIG. 10.

As illustrated in FIG. 11, the keystoning tool 58b can be replaced by a boring tool 58c mounted on tool holder 50c to bore the inner surface of the workpiece P clamped to the work station. At the same time, the exterior turning tool 109 and the exterior grooving tool 124 can simultaneously machine the outer periphery of the workpiece. When the interior surface is merely bored, the grooving tool 124 can provide a deeper exterior groove in the exterior surface as illustrated in FIG. 11.

THE CONTROL SYSTEM

Referring now more particularly to FIG. 13, a suitable source of power, such as 110 volt, 60 cycle, alternating current, is connected across a pair of lines L1 and L2. A plurality of lines, generally designated L3 – L18, are connected across the lines L1 and L2 and include a plurality of circuit elements to be presently described. Connected in line L3 is the armature of the spindle drive motor armature M1 for driving the clamp support spindle 48. The guillotine lowering solenoid 22a (line L4) is connected in series with sets of normally open contacts LS–1a and LS–3a which are respectively closed when the limit switches LS–1 and LS–3, respectively, positioned in the paths of the actuator 23 on the clamp actuating cylinder 24 and the closing sleeve, C are actuated. The guillotine raise solenoid 22b (line L5) is connected in series with the normally closed contacts LS–1b which open when the ring clamp 10 has been retracted to its rearwardmost position, illustrated in chain lines, so that the actuator 23, on the clamp actuating cylinder 24, actuates the switch LS–1. The clamp advancing solenoid 24a (line L6) is connected in series with the normally open contacts LS–2a of the limit switch LS–2 which is actuated when the guillotine G is in its lowermost position after stripping a ring P from the stack S and moving it downwardly into the closing sleeve C. The clamp retract solenoid 24b (line L7) for retracting the clamp control cylinder 24 is connected in series with the normally open conenergize the carriage advance solenoid 102a to advance the external surface machining tool 109 into cutting engagement with the outer surface of the clamped engine ring (FIG. 3). Simultaneously, the timer contacts T2 (line L18) close to energize the carriage advance solenoid 118a (line L18) to feed the diametrically opposed, external surface machining tool 124 in a cutting path of travel to progressively plunge out a groove in the outer peripheral surface of the ring. The diametrically opposed outer peripheral portions of the clamped ring are thus simultaneously machined to provide truly concentric inner and outer peripheral surfaces. When the output shaft 84 of the ROTAC unit 70 has been rotated through a predetermined angle, the actuator 88 connected thereto will engage the frame supported stop 89 to positively halt any further movement of the shaft 84 and cam supporting shaft 64 so that the movement of the cam 62 and the tool supporting slide 54 is precisely controlled and a precise cut is made. The limit switch LS–6, in the path of the ROTAC shaft supported actuator 88, is actuated to close the contacts LS–6a (line L13) to energize the retract solenoid 70b of the valve which directs fluid to the ROTAC unit in such a direction as to return the ROTAC unit and the actuator 88 to the start position, illustrated in solid lines in FIG. 6. When the ROTAC shaft 84 is returned to its start position, the actuator 88 engages the frame supported stop 90 to again positively halt the ROTAC unit shaft 84, the cam supporting shaft 64, the cam 62 mounted thereon and the tool mounting slide 54. At this time, the limit switch LS–7 is actuated by the ROTAC supported actuator 88 to close the normally open contacts LS–7a (line L11) to actuate the cutter head retract solenoid 92b to move the cutter head 14 to the axially remote position illustrated in chain lines in FIG. 1. At the same time, the limit switches LS–9 and LS–10 have been actuated by the exterior tool mounting carriages 99 and 114 to close the contacts LS–9a (line L16) and LS–10a (line L18) and energize the retract solenoids 102b 118b so that the external tool supporting carriages 99 and 114 are returned to their starting positions. When the cutter head 14 is fully retracted to its starting position, the limit switch LS–8 is actuated to close the normally open contacts LS–8a (line L7) and energize the retract solenoid 24b to retract the ring clamp 10 to the retracted position illustrated in chain lines in FIG. 2 to release the machined ring which falls to a discharge chute. When the clamp retract cylinder 24 is fully retracted, the actuator 23 engages the limit switch LS–1. The contacts LS–1c (line L9) close to energize the closing sleeve advancing solenoid 32b (line L9), to advance the closing sleeve C to the ring receiving position illustrated in solid lines in FIG. 1. When the closing sleeve is returned to its ring receiving position, the limit switch LS–3 is again actuated and the contacts LS–3a (line L4) close to energize the guillotine lowering solenoid 22a to lower the guillotine G so that the operation may again be repeated. If it is desired to replace the plunge cutting grooving tool 58 on the cutterhead 14 with the boring tool 58c (FIG. 11), it may be quickly and simply accomplished by merely backing off the bolts 80 mounting the ROTAC unit 70 to the movable carriage 72 and to the tubular support member 48, moving the ROTAC unit 70 rearwardly, inserting a spacer, illustrated in chain lines at 105 (FIG. 2), between the flange 48 and the ROTAC unit 70. The ROTAC unit and the cam supporting shaft 64, which is connected thereto, are moved axially with the ROTAC unit 70 to the chain line position, illustrated at 70' in FIG. 2, so that the cam 62 is thus axially moved out of the radial path of the tool slide 54. The tool supporting sleeve member 50 is then unturned and a boring head 50a, mounting a boring tool 58c, is threadedly received thereon.

It should be appreciated, of course, that the machine tool support heads 54, 50b, and 50c are threaded to oppose the direction of rotation so that the threads will tend to tighten during the cutting operation. This structure permits the simple and easy replacement of the machine tool support heads so that the machine can be used as either an internal diameter boring, grooving, or keystoning machine. Moreover, the time required for changeover is relatively short.

Because the ROTAC unit is directly connected to the shaft 64, there is no chatter, twisting, lost motion and play in the system and the cutting is extremely accurate. After a ring is machine and the clamps 10 and 12 are separated to release the machined ring, a sensor (not shown) can be used to prevent further cycling until the machined ring clears the work station W.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. Apparatus for machining ring-shaped workpieces, such as split engine rings, including:

supporting means;

means supported thereby for sequentially delivering workpieces to a machining station including means for axially individually moving the workpieces to said machining station and for clamping axially opposite sides of a workpiece at said machining station;

workpiece machining means, mounted on said support means for movement in an axial and radially outward path between a radially inner position, axially removed from said machining station, and a radially outer position at said machining station for machining the radially inner surface of a workpiece clamped at said machining station;

means on said support means for relatively rotating said machining means and said clamping means; and means on said support means for moving said machining means in said axial and radially outward path of travel into cutting engagement with the interior surface of a ring-shaped workpiece clamped at said machining station to progressively cut the radially inner surface of said workpiece.

2. Apparatus for machining ring-shaped workpieces comprising:

a frame;

means on said frame for sequentially delivering workpieces to a work station including means for clamping axially opposite sides thereof at said work station;

means on said frame for simultaneously machining the radially inner and radially outer surfaces of said workpieces including:

first machining means movable in a cutting path of travel between a radially inner, inoperative position and a radially outer operative position engaging the interior surface of a clamped workpiece at said work station;

means for moving said first machining means in said cutting path of travel between said radially inner and outer positions;

second machining means movable between a removed inoperative position and an operative position engaging the exterior surface of a workpiece clamped at said work station;

means for relatively rotating said first and second machining means and said clamping means when at least one of said machining means is in said operative positions; and means for moving said second machining means between said inoperative and operative positions in timed relation with the movement of said first machining means between said removed and operative positions such that the radially inner and outer surfaces are simultaneously concentrically machined.

3. The apparatus set forth in claim 2 wherein said second machining means includes a pair of generally diametrically opposed machine tools mounted for movement toward and away from diametrically opposed portions of said workpiece.

4. The apparatus set forth in claim 2 wherein said first machining means includes tool support means mounted on said frame for movement in a to-and-fro path of travel between radially inner and radially outer positions; rotatable means on said tool support means for moving said tool support means between its radially inner and outer positions when it is rotated, and means for rotating said rotatable means.

5. The apparatus set forth in claim 2 wherein said workpieces comprise constrictable workpieces each normally having a gap therein, said apparatus including tubular, workpiece receiving closing sleeve means for receiving a workpiece and cooperating with said workpiece delivering means to constrict said workpiece and at least partially close said gap as said workpiece is axially moved to said machining station; and means mounting said closing sleeve on said frame for movement in an axial path of travel between an axially removed position and a workpiece receiving position at said work station when a workpiece is clamped at said machining station.

6. Apparatus for machining ring-shaped workpieces, such as split engine rings, comprising:

a frame having a machining station thereon;

means on said frame for sequentially delivering workpieces to said machining station;

first and second clamp members mounted on said frame for relative axial movement between an axially spread, inoperative position and a less spread operative workpiece clamping position;

means for cyclically moving said clamp members between said inoperative and operative workpiece clamping positions to sequentially clamp and release workpieces delivered to said machining station;

workpiece machining means for machining the radially inner surface of a workpiece at said machining station and mounted on said frame for axial movement between an axially removed position and a position inside a workpiece clamped at said machining station;

means for relatively rotating said workpiece machining means and said first and second clamp members when said machining means is positioned inside a workpiece clamped at said machining station;

means mounting said machining means for movement in a cutting path of travel between a radially inner position and a radially outer position in cutting engagement with the interior surface of said workpiece; and means for moving said machining means in said cutting path of travel between said radially inner and outer positions when said machining means is inside said workpiece at said work machining station to progressively machine the radially inner surface of said workpiece.

7. The apparatus set forth in claim 6 wherein said machining means comprises plunge cutting tool means for cutting an annular groove in the radially inner surface of said workpiece.

8. The apparatus set forth in claim 6 including additional machining means mounted on said frame for movement between a removed inoperative position and a machining position in engagement with the outer peripheral surface of a workpiece at said machining station, and means for moving said additional machining means between said removed and machining positions, in timed relation with the movement of said first mentioned workpiece machining means, to its radially outer position so that the radially inner and outer surfaces are simultaneously, progressively and concentrically machined.

9. The apparatus set forth in claim 6 including carriage means mounted on said frame for movement in an axial path of travel toward and away from said machining station; said workpiece machining means being mounted on said carriage means for movement therewith between said axially removed position and said position inside said workpiece and for movement relative thereto between said radially inner and outer positions; said moving means for moving said machining means between said radially inner and outer positions including rotatable means on said carriage means for moving said workpiece machining means between said radially inner and outer positions, and rotary, fluid driven means directly connected to said rotatable means for rotating said rotatable means.

10. The apparatus set forth in claim 6 wherein said carriage means comprises a tubular support member, said workpiece machining means comprising a cutter head assembly removably connected to said tubular member and including cutting tool support means mounted on said cutter head assembly for reciprocating movement between radially inner inoperative, and radially outer, operative, positions; said rotatable means being disposed within said tubular member and including means for reciprocating said cutting tool mounting means between said radially inner and outer positions when said rotatable means is rotated.

11. The apparatus set forth in claim 10 wherein said reciprocating means is axially aligned with said rotatable means so as to be wholly within the perimetrical outline of said rotatable means in at least one position such that said reciprocating means and rotatable means and said cutterhead assembly are relatively axially movable.

12. Apparatus for machining the radially inner surface of a ring-shaped workpiece, such as a split engine ring, comprising:
- a frame having a workpiece machining station thereon;
- means on said frame for sequentially delivering workpieces to said machining station;
- first and second clamps for clamping a workpiece delivered to said machining station;
- a tubular support member mounted on said frame;
- a cutter head assembly removably connected to said tubular member and including cutting tool support means mounted on said cutter head assembly for to-and-fro movement between radially inner inoperative and radially outer operative positions;
- means for relatively rotating said cutter head assembly and said clamps when said tool support means is in said radially outer operative position;
- rotatable means, having at least a portion rotatably disposed within said tubular member, and including means for feeding said cutting tool support means in a cutting path of travel between said radially inner and outer positions to machine the radially inner surface of a workpiece clamped at said work station when said rotatable means is rotated; and
- means for rotating said rotatable means to feed said cutting tool support means in said cutting path of travel;
- said moving means being of such size with respect to said rotatable means so that in at least one position of rotation of said rotatable means, the moving means is wholly within the radial extent of said rotatable means, and said rotatable means and said moving means, and said cutterhead assembly are relatively axially movable when the moving means and said rotatable means are aligned to permit said cutterhead assembly to be removed from said tubular member.

13. The apparatus of claim 12 wherein said rotatable means comprises a rotatable shaft and said feeding means comprises cam means fixed to said shaft for movement therewith to move said tool support means between said radially inner position and said radially outer position; said cam means being of such size with respect to said shaft that it can be positioned wholly radially within the radial extent of said shaft such that said moving means and rotatable means and said cutterhead assembly are relatively axially movable.

14. Apparatus as set forth in claim 13 wherein said cutting tool support means is mounted for generally radial movement in a to-and-fro path of travel; said moving means comprising cam means for moving said cutting tool mounting means.

15. The apparatus set forth in claim 13 wherein said tubular support member is mounted for axial movement toward and away from said machining station to move said cutterhead assembly between an axially removed position and a position at said machining station; means is provided for axially moving said tubular support member and cutterhead between said axially removed and said position at said machining station.

16. Apparatus for machining ring-shaped workpieces comprising:
- a frame having a machining station thereon;
- means for sequentially delivering workpieces to said machining station;
- means for clamping a workpiece delivered to said machining station;
- carriage means mounted on said frame and movable in an axial path of travel toward and away from said machining station;
- means for moving said carriage means in said axial path of travel;
- workpiece machining means mounted on said carriage means for movement therewith between an axially removed position and a position inside said workpiece and for movement relative thereto in a cutting path of travel between radially inner and radially outer positions;
- rotatable means on said carriage for feeding said workpiece machining means between said radially inner and outer positions;
- rotary fluid driven motor means directly connected to, and axially aligned with said rotatable means for rotating said rotatable means at said machining station in a to-and-fro rotary path of travel to feed said workpiece machining means between said radially inner and outer positions;
- fluid circuit means for directing fluid to said motor means to rotate said rotatable means in a first direction and move said workpiece machining means between said radially inner and outer positions when said workpiece machining means is inside said workpiece;
- additional fluid circuit means for directing fluid to said motor means to oppositely rotate said rotatable means so that said rotatable means returns said workpiece machining means to said radially inner position.

17. The apparatus set forth in claim 16 including stop means for positively halting said rotary motor after said rotatable means has been rotated by said fluid circuit means through a predetermined angular displacement.

* * * * *

UNITED STATES PATENT OFFICE
CERTIFICATE OF CORRECTION

Patent No. 3,756,099      Dated September 4, 1973

Inventor(s)  EDWARD F. SULLIVAN

It is certified that error appears in the above-identified patent and that said Letters Patent are hereby corrected as shown below:

Column 4, line 43, cancel "workpiece", line 44, "holding" should read -- tool mounting -- ; line 46, "workpiece holding" should read -- tool mounting -- . Column 5, line 67, "f" should read -- h -- . Column 6, line 3, cancel ", in the path repre-", line 4, cancel "sented by the arrows g,"; line 40, "13" should read -- 12. Column 7, line 2, cancel "ROTAC supported"; line 3, "88" should read -- 97 on the piston rod 94 -- ; line 5, "32" second occurrence should read -- C -- ; line 19, change "72" to -- 92 -- ; line 29, change "9" to -- 6 -- ; line 43, change "9" to -- 6 -- . Column 8, line 44, change "L5" to -- L10 -- ; line 57, cancel "82" . Column 9, line 68, "48" should read -- 48a -- . Column 10, line 7, "50a" should read -- 50c -- . Column 11, line 64, after "moving", insert -- one of -- . Column 13, lines 35, 37, 40 and 41, change "moving" to -- feeding -- Column 14, line 2, cancel "mov-"; line 3, "ing" should read -- feeding -- . Column 14, line 45, after "workpiece;" insert -- and -- . Column 14, line 52, after "motor" insert -- means -- .

Signed and sealed this 6th day of August 1974.

(SEAL)
Attest:

McCOY M. GIBSON, JR.
Attesting Officer

C. MARSHALL DANN
Commissioner of Patents